United States Patent [19]

Gravenhorst et al.

[11] 4,342,882
[45] Aug. 3, 1982

[54] AUTOMATIC PAUSE GENERATOR FOR DIALERS

[75] Inventors: Peter Gravenhorst, Berlin; Johannes Krenz, Kiel, both of Fed. Rep. of Germany

[73] Assignees: Krone GmbH, Berlin, Fed. Rep. of Germany; Hagenuk, Kiel, both of Fed. Rep. of Germany

[21] Appl. No.: 192,890

[22] Filed: Oct. 1, 1980

[30] Foreign Application Priority Data

Oct. 3, 1979 [DE] Fed. Rep. of Germany ....... 2940490

[51] Int. Cl.³ .......................................... H04M 1/274
[52] U.S. Cl. .................................................. 179/90 B
[58] Field of Search ........... 179/90 B, 90 BD, 90 BB, 179/90 AD, 18 B, 18 P, 18 DA, 18 AD, 84 R

[56] References Cited

U.S. PATENT DOCUMENTS 3,553,382  1/1971  Knox et al. .................... 179/18 DA
3,784,757  1/1974  Woolf et al. .................. 179/18 DA
3,932,709  1/1976  Hoff et al. ......................... 179/90 B
4,053,718 10/1977  Derveaux .......................... 179/90 B Primary Examiner—Gerald L. Brigance
Attorney, Agent, or Firm—Lawrence A. Maxham

[57] ABSTRACT

An automatic dialing pause generator for use in telephone terminals with pulse dialing and additional features such as abbreviated number dialing, redialing, direct dialing and the like automatically provides a pause between selected digits dialed by the telephone terminal. Specifically, the present invention inserts a pause automatically after transmitting a directory number having an exchange code number. Memory write-in logic monitors the dialing input from a keyboard and from a keyboard decoder for the entering of an exchange code number to be stored in an exchange code memory. In addition, the memory write-in logic also recognizes the entering of a dialing command from keyboard and keyboard decoder as normal or abbreviated number dialing and stores it in a directory number memory which controls the dialing through a digit and pause generator. Simultaneously with the transmission of the first digit from the directory number memory, the transmitted number is checked for correspondence with one of the directory numbers previously stored in the exchange code number memory by a comparator circuit. When the transmitted digit and the exchange code number correspond, a pause criterion is produced after this digit by the directory number memory and the digit and pause generator creates a pause in transmission. During the pause, the speech circuit is connected to the loop and transmission of the next digit is prevented.

5 Claims, 1 Drawing Figure

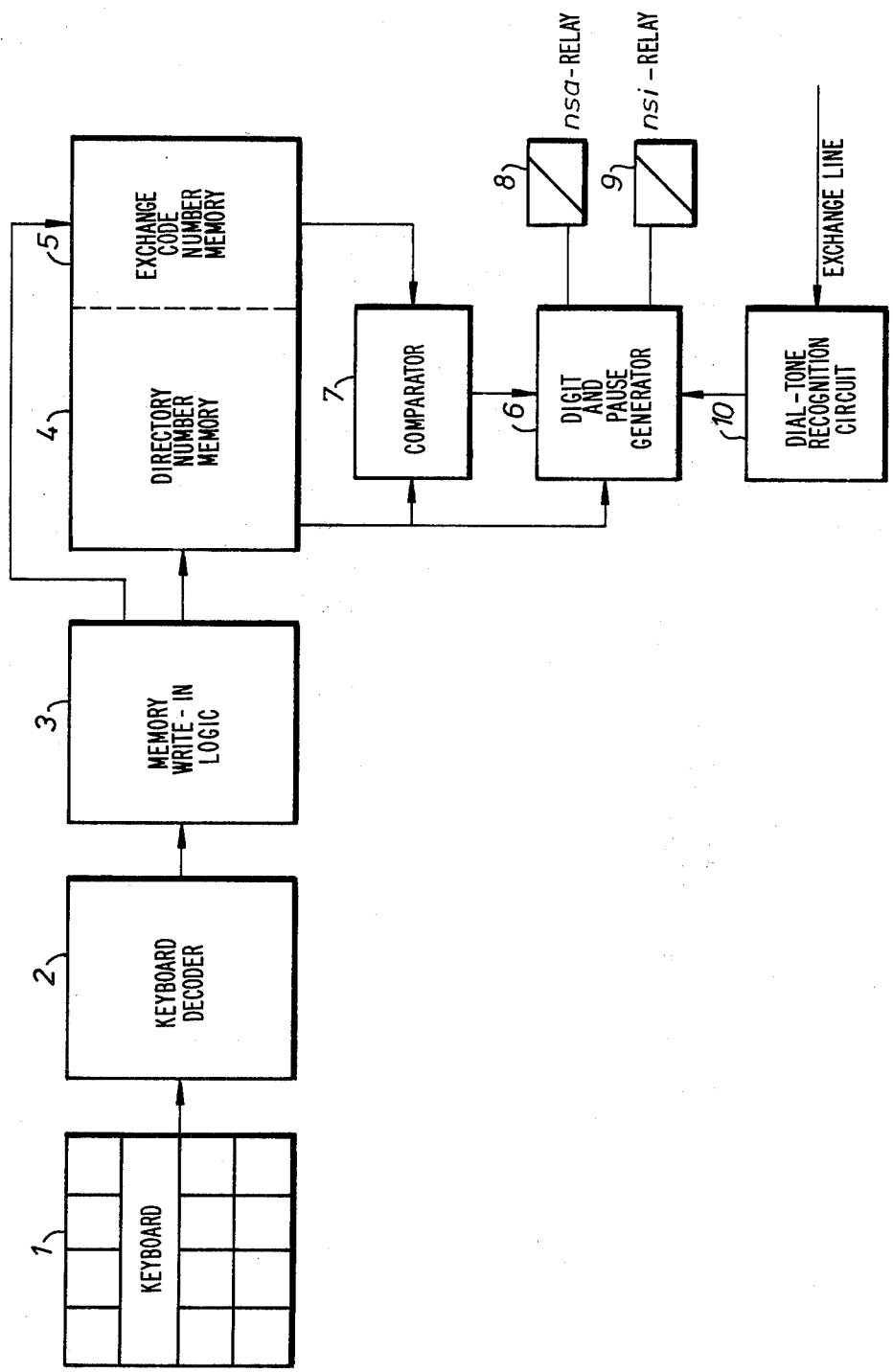

AUTOMATIC PAUSE GENERATOR FOR DIALERS

FIELD OF THE INVENTION

The invention relates to an automatic pause generator for dialers in telephone terminals with pulse dialing and additional features such as abbreviated number dialing, redialing, direct dialing and the like.

BACKGROUND OF THE INVENTION

In known dialers with directory number storage and redialing, a pause is generally inserted after the first digit. However, this pause has proven to be a disadvantage in intra-exchange traffic in private automatic branch exchanges (PABX).

Moreover, abbreviated number dialing is performed in such fashion that no pause is inserted as the abbreviated directory number is entered.

It is also known that by waiting for the dial tone, a pause can be inserted in normal dialing from PABXs, whereby redialing is possible with a pause. Redialing is not possible with inserting a pause during normal dialing from PABXs since no pause is then inserted after the exchange code number.

All of the above solutions suffer from the disadvantage that either the pause (which is required after dialing the exchange code number) is also transmitted internally, or operating situations can occur in which no pause is inserted when dialing the exchange. This creates the possibility of incorrect dialing.

By contrast with this known state of the art and the disadvantages associated therewith, the goal of the invention is to provide a circuit which makes it possible for the dialer to insert automatically a pause after the exchange code number when transmitting a directory number with a specified exchange code number, independently of the generation of this directory number, e.g., by normal dialing, redialing, abbreviated number dialing or direct dialing, thus making additional operating procedures unnecessary and ensuring greater convenience for the user. The exchange code number should be arbitrary and freely programmable by the subscriber; in particular, it must be capable of being changed or even erased completely if necessary by the subscriber, using keyboard entry procedures.

SUMMARY OF THE INVENTION

The goal is achieved according to the invention by virtue of the fact that a memory write-in logic monitors the dial input through a keyboard and monitors a keyboard decoder for the entry of an exchange code number to be stored. When an exchange code number is specified, it is stored in an exchange code number (second) memory. The system also recognizes the entry of a dialing command through the keyboard and the keyboard decoder as a "normal" dialing process or abbreviated number dialing, and stores it in the directory number (first) memory. Dialing and auxiliary dialing relays NSA and NSI, respectively, are controlled by the directory number memory through a digit and pause generator. Simultaneously with the transmission of the first digit, a comparator checks the transmitted directory number for correspondence with one of the directory numbers stored in the exchange code number memory. When the transmitted digit and the stored exchange code number correspond, a pause criterion is given after this digit by the directory number memory to the digit and pause generator; also, during the pause, the NSA relay connects a speech circuit to the outgoing telephone loop thus preventing the NSI relay from transmitting the next digit.

BRIEF DESCRIPTION OF THE DRAWING

The drawing FIGURE shows a block diagram of one form of the invention.

DESCRIPTION OF THE PREFERRED EMBODIMENT

Referring to the drawing, the invention comprises a dialing pause generator for use with pulse-type automatic telephone dialers having digit specification means in the form of a keyboard 1 and a keyboard decoder 2, digit pause generation means 6 and a first and second input providing a dial pulse output connected to an outgoing telephone circuit according to the digit pulse generator first and second inputs.

More specifically, the generator comprises a first storage means (a directory number memory 4) having a first storage means input and a first storage means output. The first storage means input is connected to the digit specification means through memory logic 3 for storage of the digits dialed according to the digit specification means. And the first storage means output is connected to the first input of the digit pause generation means 6, providing dialing pulses at the dial pulse output according to the first storage means output.

A second storage means 5 has a second storage means input and a second storage means output. The second storage means input is connected to the digit specification means through the memory logic, whereby the second storage means independently stores a digit sequence comprising at least one digit, and the stored digit is presented at the second storage means output.

A comparator 7 having first and second comparator input is connected to receive and compare the first storage means output and the second storage means output, respectively, providing an output signal at the comparator output upon the coincidence of an identity of signals at the first and second comparator inputs.

A pause generator, which is incorporated in block 6, has a pause generator input connected to the comparator output. Pursuant to an output signal from the comparator a pause is produced in the dial pulse sequence produced by the digit and pause generator.

Advantageously, all pertinent circuits can be contained in a microprocessor.

Referring more specifically to the structure and operation of the preferred embodiment of FIG. 1, when any directory number is dialed, or when the directory number memory is called up by keyboard 1 and keyboard decoder 2, memory write-in logic 3 recognizes this fact and, immediately after the first keyboard command is entered, begins dialing by interrogating the directory number memory 4 and starts the digit and pause generator 6, whereby NSA relay 8 shorts out the speech circuit and NSI relay 9 transmits the dialing pulses to the exchange loop. As the first digit is transmitted, comparator circuit 7 checks to determine whether this digit is identical to one of the exchange code numbers stored in the exchange code number memory 5. If this is the case, a pause is added by the digit and pause generator 6 after the exchange code number. Hence, preliminary storage of the pauses during the storage of the directory number is not required, resulting in a saving of memory capacity.

Advantageously, a dial tone detector 10 has an input connected to the outgoing telephone circuit to receive a dial tone and an output connected to the pause generator output to limit the pause output signal upon the occurrence of a dial tone.

Moreover, the dial pause generator can draw its power from the outgoing telephone circuit.

The pause can be of a fixed length, or it can be terminated when the dial tone arrives by actuating a redialing button or if an additional dial tone recognition circuit 10 is provided. In order to avoid adding additional buttons to the keyboard, the exchange code numbers can be entered by simultaneous actuation of function keys, e.g., by pressing an abbreviated number dialing button and a redialing button. When several exchange numbers are entered, a memory address is added as well. Erasure is accomplished by entering the addresses without following them by an exchange code number, or, if only an exchange code number has been stored, by an equivalent procedure. Erasure of the exchange code numbers can be combined with a simultaneous erasure of the exchange number memory.

It should be evident that the invention can be implemented according to various circuits by those skilled in the art. Accordingly, it is not intended to limit the invention to what has been shown and described except as indicated in the appended claims.

What is claimed is:

1. An automatic pause generator for dialers in telephone terminals with pulse dialing and additional features such as abbreviated dialing, re-dialing, direct dialing and the like, said pause generator comprising:
   a keyboard;
   a keyboard decoder connected to said keyboard;
   exchange code number memory means coupled to said keyboard and said keyboard decoder for storing at least one exchange code number containing at least one digit which is selectively changeable;
   directory number memory means coupled to said keyboard decoder to store at least one directory number input from said keyboard for transmission to a telephone line;
   comparator means connected from said exchange code number memory means and said directory number memory means;
   a digit and pause generator coupled to said comparator means and said directory number memory means; and
   dialing and speech relays adapted to connect said digit and pulse generator to said telephone line;
   whereby upon transmission of the first digit of the transmitted directory number, said digit is compared in said comparator means with at least said one digit stored in said exchange code number memory means and upon coincidence of such digits, a pause criterion is supplied to said digit and pulse generator by said directory number memory means thereby producing a pause in the number being transmitted to said telephone line.

2. The pause generator as claimed in claim 1 wherein said pause generator includes a microprocessor.

3. The pause generator as claimed in claim 1 and further comprising a speech suppression means operable to inhibit a telephone speech circuit connected to said telephone line during a pause generated by said digit and pause generator.

4. The pause generator as claimed in claim 1 and further comprising a dial tone detector having an input connected to said telephone line to receive a dial tone and an output connected to said digit and pause generator output to limit said pause output signal upon the occurrence of said dial tone.

5. The pause generator as claimed in claim 1 wherein the power required to operate said pause generator is drawn from said telephone line.

* * * * *